(12) United States Patent
Brachert et al.

(10) Patent No.: US 7,431,009 B2
(45) Date of Patent: Oct. 7, 2008

(54) METHOD FOR OPERATING AN INTERNAL COMBUSTION ENGINE

(75) Inventors: Goetz Brachert, Stuttgart (DE); Ruediger Herweg, Esslingen (DE); Kai Kanning, Stuttgart (DE); Matthias Pfau, Ludwigsburg (DE); Jochen Schaeflein, Stuttgart (DE); Hans-Juergen Weimann, Oppenweiler (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/573,257

(22) PCT Filed: Sep. 2, 2004

(86) PCT No.: PCT/EP2004/009756

§ 371 (c)(1), (2), (4) Date: Feb. 13, 2007

(87) PCT Pub. No.: WO2005/038219

PCT Pub. Date: Apr. 28, 2005

(65) Prior Publication Data

US 2007/0227496 A1  Oct. 4, 2007

(30) Foreign Application Priority Data

Sep. 25, 2003  (DE)  ............................... 103 44 429

(51) Int. Cl.
*F02B 17/00* (2006.01)
*F02M 25/07* (2006.01)

(52) U.S. Cl. ................... 123/295; 123/299; 123/568.14
(58) Field of Classification Search ................. 123/295, 123/299, 568.14, 90.15
See application file for complete search history.

(56) References Cited

U.S. PATENT DOCUMENTS

| 4,182,288 | A   | * | 1/1980  | Thauer .................. 123/78 AA |
| 6,014,158 | A   |   | 1/2000  | Ziegelmuller et al. |
| 6,192,858 | B1  |   | 2/2001  | Nieberding |
| 6,386,177 | B2  | * | 5/2002  | Urushihara et al. ......... 123/299 |
| 6,499,458 | B1  |   | 12/2002 | Nieberding |
| 2001/0015192 | A1 |  | 8/2001 | Urushihara et al. |
| 2001/0050067 | A1 |  | 12/2001 | Sato |
| 2002/0011233 | A1 |  | 1/2002 | Shiraishi et al. |
| 2002/0046741 | A1 |  | 4/2002 | Kakuho et al. |

FOREIGN PATENT DOCUMENTS

| DE | 195 19 663 A1 | 5/1996 |
| DE | 198 18 569 A1 | 11/1998 |
| DE | 198 10 935 A1 | 9/1999 |
| DE | 198 52 552 C2 | 5/2000 |

* cited by examiner

*Primary Examiner*—John T. Kwon
(74) *Attorney, Agent, or Firm*—Crowell & Moring LLP

(57) ABSTRACT

A method for operating a four stroke internal combustion engine in which the combustion position can be set/controlled/corrected. The phase position of intake and/or exhaust phase is shifted for this purpose. Compression ignition takes place at part-load, and spark ignition takes place at full load. In the event of a load change in the part-lead range, the theoretical shift in the combustion position is compensated by the shift in phase position of the intake and/or exhaust phase.

4 Claims, 2 Drawing Sheets

METHOD FOR OPERATING AN INTERNAL COMBUSTION ENGINE

This application claims priority from PCT Application No. PCT/EP2004/09756 filed on Sep. 2, 2004, which claims priority to German Application No. 103 44 429.7 filed on Sep. 25, 2003, the entire disclosure of which is incorporated herein by reference.

BACKGROUND AND SUMMARY OF THE INVENTION

The present invention relates to a method for operating an internal combustion engine.

By way of example, DE 195 19 663 A1 has disclosed a method for operating an internal combustion engine with spontaneous ignition, in which in a first stage a homogenous, precompressed fuel/air mix which is not suitable for spontaneous ignition is provided in the working space, and in a second stage an additional quantity of the same fuel is injected into the working space in order to bring about the spontaneous ignition. In this case, the fuel/air mix is prepared by external mix formation and introduced into the working space, where it is compressed to close to the spontaneous ignition point. The injection of the additional quantity of fuel in the second stage takes place in finely atomized form, avoiding contact with the walls, so as to form a mix cloud in which, on the one hand, the fuel/air ratio is no greater than the stoichiometric mixing ratio and in which, on the other hand, the spontaneous ignition condition is achieved.

Furthermore, DE 198 52 552 C2 has disclosed a method for operating a four-stroke internal combustion engine which, at part-load, forms a lean base mix from air, fuel and retained exhaust gas and, at full load, forms a stoichiometric mix. At part load, compression ignition takes place, whereas at full load spark ignition takes place. Furthermore, mechanically controlled exhaust-gas retention with switchable valve closure overlap and exhaust gas throttling is provided. An activation injection can be carried out into the retained exhaust gas. The quantity of retained exhaust gas, with the valve closure overlap switched on, is controlled or preset as a function of the engine speed and engine load by an exhaust-gas throttle valve which is active for all the combustion chambers. The pressure when the intake members open into the individual combustion chambers is evened out by a cylinder-selective, cylinder-consistent activation injection.

A method for operating a four-stroke, reciprocating-piston internal combustion engine is also known from DE 198 18 569 C2. It is characterized by a homogenous, lean base mix of air, fuel and retained exhaust gas and by compression ignition and direct injection of the fuel into the combustion chamber. The volume of the combustion chamber changes cyclically. The combustion chamber can be filled with fresh gas through at least one intake member, while the combustion exhaust gases can be at least partially expelled through at least one exhaust member. In the part-load range and in the lower full-load range, the internal combustion engine is operated with compression ignition and preferably mechanically controlled exhaust-gas retention, whereas in the full-load range and high part-load range it is operated on the Otto cycle.

One drawback of the above known methods documents is in particular that the temperature of the exhaust gas and the composition of the working gas change in the event of changes in load. The reactivity of the mix during compression ignition is likewise altered as a result, even to the extent of causing misfires if the working gas temperatures are too low.

By contrast, an object of the invention is to provide a method for operating an internal combustion engine which takes into account and/or corrects changes in the reactivity of the mix in the event of changes in engine speed.

This object is achieved by a method whereby in the event of a change in the load state, the theoretical shift in the combustion position is compensated for by the shift in the phase position of intake and/or exhaust phase. A targeted change in the control times of this nature allows changes in the working gas composition in the event of load changes to be effectively corrected.

In the event of a reduction in the engine load, either the intake phase can be shifted in the late direction or the exhaust phase can be shifted in the early direction, or the two phase shifts can be carried out simultaneously, in which case the effects are cumulative.

BRIEF DESCRIPTION OF THE DRAWINGS

An embodiment of the present invention is described in greater detail on the basis of the drawings, in which.

DETAILED DESCRIPTION OF THE DRAWINGS

Figure 1:
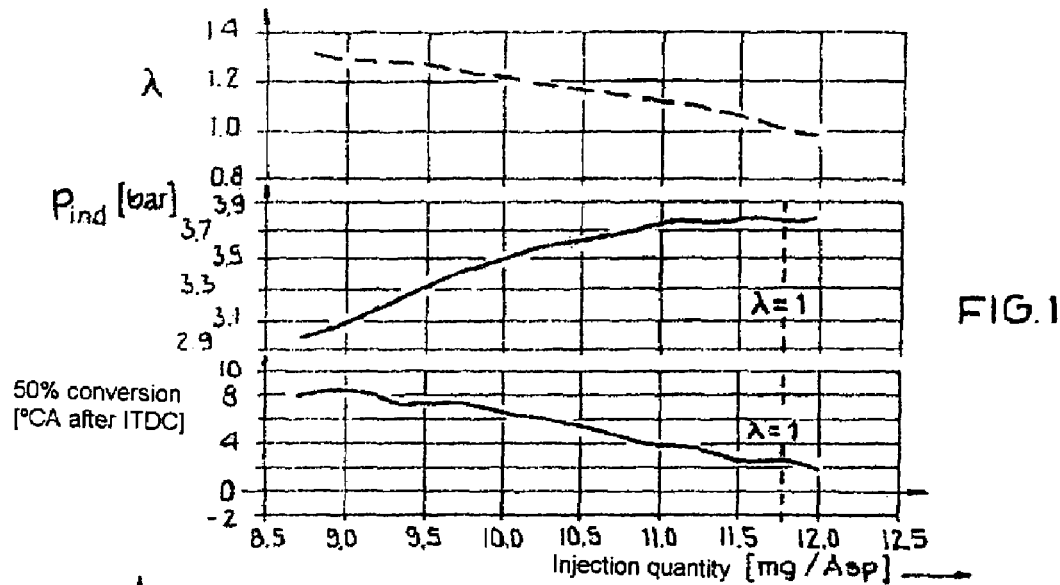
FIG. 1 is a diagram showing the air/fuel ratio, indicated mean effective pressure and combustion position as a function of the injection quantity.

The driving factor behind research and development in internal combustion engines is the desire to constantly improve fuel consumption while, at the same time, reducing untreated emission levels. In the case of externally ignited internal combustion engines, in particular alternative load control methods are recommended to increase the part-load efficiency. The most important development trends are the stratified direct injector, which with the aid of quality control moves the externally ignited internal combustion engines closer to the spontaneously igniting internal combustion engines (diesel engine), and the variable valve gear combined with residual gas strategies, which are intended to limit charge exchange losses. Both methods theoretically promise major benefits but are thwarted, on one hand, by the expensive aftertreatment of the exhaust gas from the superstoichiometric mix and, on the other hand, by the limited residual gas compatibility of externally ignited internal combustion engines. The ideal is a link between these two methods: a quality-controlled internal combustion engine with high residual gas content and spontaneous ignition, which on account of homogenous combustion in superstoichiometric operation emits very little if any nitrogen oxide.

One property of homogeneous combustion methods is the spontaneous ignition time, which is determined by the temperature or mix composition. If the required charging temperatures are realized with the aid of exhaust-gas retention, more specifically by way of the parameters exhaust-gas temperature and quantity, the result is that the combustion position of cycle n is dependent on the preceding cycle (n-1); the required spontaneous ignition temperature is not reached in extreme circumstances. The combustion position for its part is the determining factor for the target variables of the internal combustion engine and therefore must have values which are defined as a function of load and engine speed.

An object of the present invention is to find ways of implementing the changes in exhaust-gas quantity and temperature which are required in the event of a change in operating point within the part-load range covered by the chamber ignition combustion without adversely affecting the combustion.

Exhaust-gas retention can in principle be achieved with the aid of suitable control times. This requires firstly early closing of the exhaust valve, in order to keep the required quantity of residual exhaust gas in the combustion chamber of the internal combustion engine. To prevent the hot exhaust gas from flowing back into the induction pipe, with ensuing cooling effects and charge losses, at the same time the intake valve is opened later. However, this concept cannot be applied to conventional, externally ignited internal combustion engines without further measures.

If this valve closure overlap is made sufficiently variable, the first control concept results for this form of providing the required temperature. The requirement for an unaffected high-pressure part and therefore optimum charging in this case, however, presupposes the use of a fully variable valve gear, in which opening time and closing time can be adjusted independently of one another.

Returning to the conventional camshaft, the setting of a defined exhaust-gas retention rate remains the job of the camshaft actuators which are already in widespread series use. As an undesirable side-effect, with a rigid cam contour, the angle at which the valve opens changes with the angle at which the valve closes, which leads to charging and efficiency losses and not least to a restricted operating range in terms of load and engine speed.

In addition to the control of the temperature at the end of compression with the aid of the exhaust-gas retention rate or quantity, the use of the direct injection and the operation of the internal combustion engine with excess air also influences the working gas temperature and/or the mix composition of the fuel. The effect of the direct injection can in this case be divided into two mechanisms: firstly, a thermal effect, which provides an increase in the exhaust-gas temperature as a result of the conversion of the pre-injected fuel, and secondly the occurrence of a preconditioning of the fuel, which increases the reactivity of the latter and therefore influences the integral ignition delay.

To provide a better understanding of the method according to the invention, FIG. 1 shows a diagram showing the air/fuel ratio, the indicated mean effective pressure and the combustion position as a function of the injection quantity.

To determine the influence of the load on the chamber ignition combustion, starting from a reference point of the internal combustion engine (2000 rpm and 3 bar $p_{mi}$), the injection quantity is increased with otherwise constant boundary conditions. As can be seen from FIG. 1, there is a linear relationship between the air/fuel mix and the injected fuel mass. Therefore, under the selected boundary conditions, in particular with constant control times, the intake fresh air mass remains constant irrespective of load. The load ($p_{mi}$) initially rises linearly but later rises only sub-proportionally. This deterioration in efficiency with a relatively rich mix results from a drop in the degree of conversion and from the excessively early combustion position. The deterioration in the conversion, which manifests itself in particular in a rise in the CO emissions, results from the combination of exhaust-gas retention and direct injection. If the fuel is introduced directly into the combustion chamber of the internal combustion engine, under the precondition of more or less extensive stratification between residual gas and fresh charge, mixing with exhaust gas is inevitable or at least highly probable. With rich air/fuel ratios, the oxygen content in the exhaust gas also drops and the fuel which is provided there can then no longer be fully oxidized. The visible shift in the combustion position toward an early position results from the increasing exhaust-gas temperatures. If the conversion deteriorates and therefore the exhaust-gas temperatures drop despite a further increase in the injection quantity, the shift in the combustion position also ceases.

If, at the selected reference point of 2000 rpm and 3 bar $p_{mi}$ and a constant injection mass, the phase positions of intake and exhaust camshaft are now altered, the effect of primary influencing parameters, such as for example the valve control times, will be immediately apparent.

Figure 2:
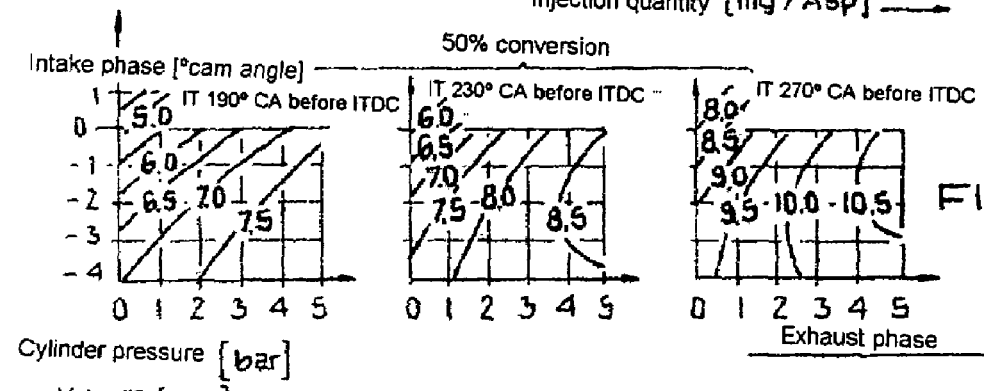
FIG. 2 is a graph illustrating the combustion position as a function of intake and exhaust phase.

FIG. 2 diagrammatically depicts the combustion position as a function of intake and exhaust phase.

Accordingly, an adjustment in the exhaust phase in the early direction effects a shift in the combustion position in the early direction. A later intake phase likewise leads to a shift in the combustion in the early direction to approximately the same extent. In the event of simultaneous adjustment of the phase positions, the effect is doubled. Therefore, the control times of intake and exhaust valves should not be considered separately from one another, but rather have an influence on one another.

Figure 3:
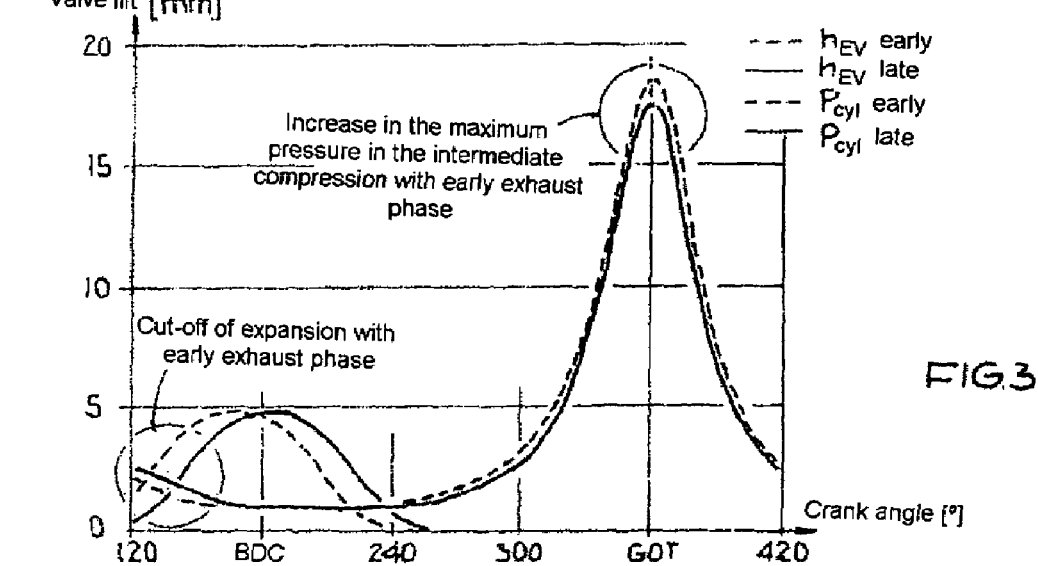
FIG. 3 is a diagram showing the cylinder pressure during the intermediate compression as a function of the exhaust phase.

If the crankshaft-resolved indexing data as shown in the diagram illustrated in FIG. 3 are considered, the shift in the combustion position can be explained. FIG. 3 illustrates the rise in the cylinder pressure during the intermediate compression with earlier closing of the exhaust valve. On account of the increase in the residual gas content, the gas temperature in the compression rises, and accordingly the combustion begins earlier. However, the increase in the maximum pressure at the gas exchange dead center is relatively low compared to a shift in the closing of the exhaust valve of a fully variable valve gear. On account of the rigid cam contour, earlier closing of the exhaust valve also leads to a shift in the opening angle of the exhaust valve, cutting off the expansion. Since opening takes place at an ever higher back pressure, even in this phase more exhaust gas flows out of the combustion chamber of the internal combustion engine.

Figure 4:
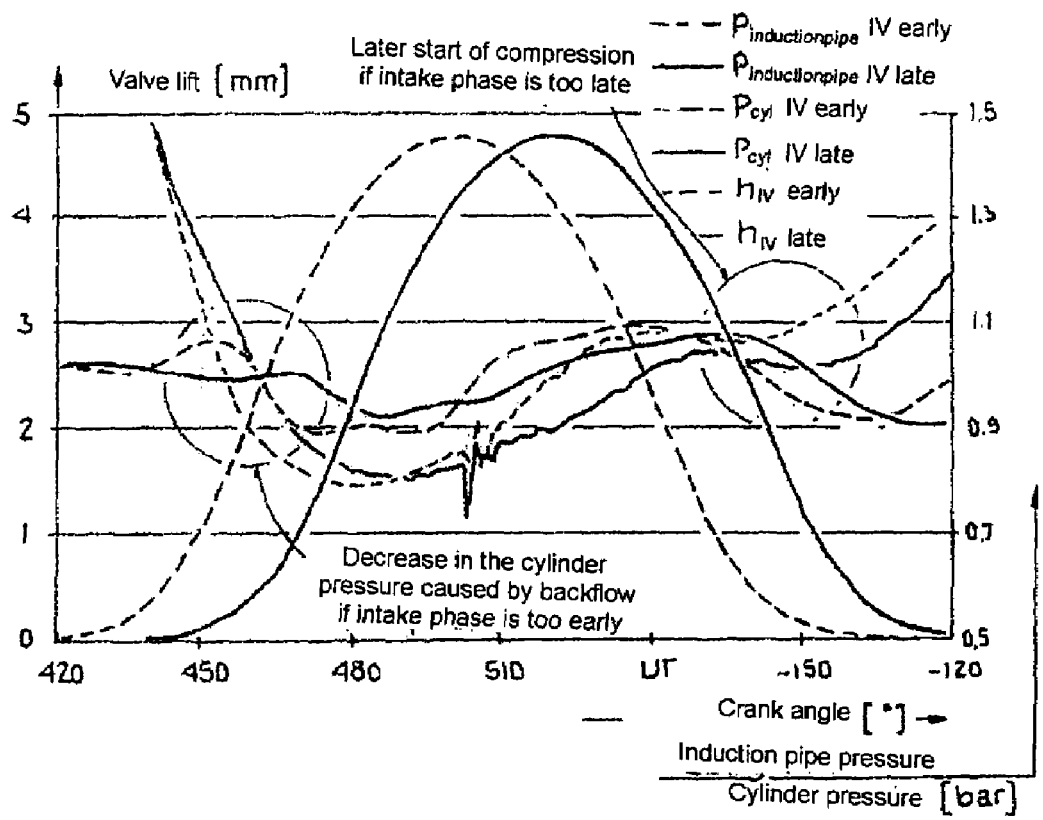
FIG. 4 is a diagram showing the cylinder pressure and induction pipe pressure during the induction phase as a function of the intake phase.

There are two limit scenarios for the shift in the intake phase, as can be seen from FIG. 4. On one hand, exhaust gas flows back out of the combustion chamber into the induction pipe if the intake valve opens too early. This leads to an excessive rise in pressure in the induction pipe and to a decrease in pressure in the combustion chamber. The other limit situation results from the intake valve closing too late. In this case, charge losses occur as a result of the combustion chamber charge which has been freshly drawn in being discharged, leading to a reduction in the effective compression.

Figure 5:
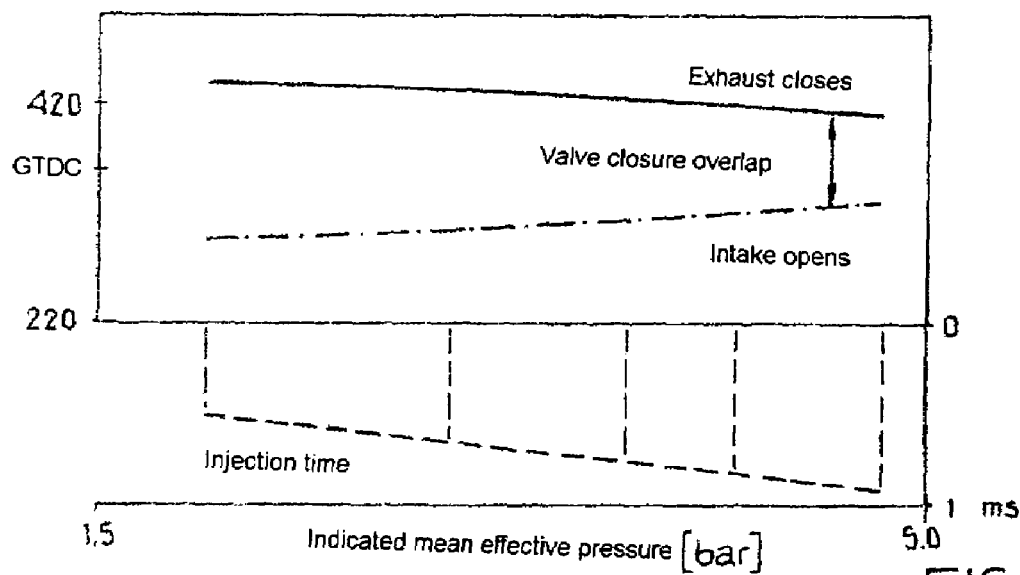
FIG. 5 diagrammatically depicts the adjustment strategy for changing the load with a constant engine speed.

FIG. 5 diagrammatically depicts the adjustment strategy for increasing the load at a constant engine speed. In the event of a change in the load, the speed of the hydraulic camshaft adjusters is only sufficient for a slow, continuous adjustment of the exhaust-gas retention rate. On account of the exhaust-gas temperature rising with the converted fuel mass, the temperature level has to be adapted again using the exhaust-gas retention quantity after the intake valve has closed, so that the combustion does not begin too early. In this context, the order in which the two operations (increase or reduction in the injection quantity and setting of the correct valve closure overlap) are carried out is important. When using the exhaust-gas retention, as has already been mentioned above, the exhaust-gas temperature and the quantity of exhaust gas retained from the previous cycle are crucial to reliably triggering spontaneous ignition.

Therefore, exhaust-gas quantity and exhaust-gas temperature always have to be considered jointly. For a transition from a low load at low exhaust-gas temperature with a high residual gas mass to a high load at high exhaust-gas temperature with a small residual gas mass, first of all the injection quantity introduced synchronously with the induction has to be increased. In the high-pressure part, this greater quantity of fuel is converted, with the result that the exhaust-gas temperature rises. Only then can or must the retention rate be compensated for by the valve closure overlap. The same applies to load changes in the opposite direction.

The invention claimed is:

1. A method for operating a four-stroke internal combustion engine, comprising:
   injecting fuel directly into at least one combustion chamber of the internal combustion engine, the volume of which changes cyclically,
   supplying fresh gas through at least one intake valve and discharging combustion exhaust gas through at least one exhaust valve,
   at part-load, forming a lean base mix of air, fuel and retained exhaust gas, and at full load forming a stoichiometric mix, and
   having compression ignition take place at part-load and spark ignition take place at full load, wherein within the part-load range in the event of a change in load state, the theoretical shift in the combustion position occurring in the at least one combustion chamber during compression ignition is compensated by the shift in phase position of at least one of an intake and exhaust phase.

2. The method as claimed in claim 1, wherein, within the part-load range when a load state changes, the combustion is shifted in the early direction by adjusting the exhaust phase in the early direction, with the exhaust valve being opened.

3. The method as claimed in claim 1, wherein, within the part-load range when load state stages, the combustion is shifted in the early direction by the intake phase being adjusted in the late direction, with the intake valve being opened later.

4. The method as claimed in claim 3, wherein, within the part-load range when a load state changes, the combustion is shifted in the early direction by adjusting the exhaust phase in the early direction, with the exhaust valve being opened.

* * * * *